US012349261B2

(12) United States Patent
Severinkangas

(10) Patent No.: US 12,349,261 B2
(45) Date of Patent: Jul. 1, 2025

(54) METHOD AND SYSTEM OF CONFIGURING AN ILLUMINATION SYSTEM OF A BUILDING

(71) Applicant: Tridonic Portugal, Unipessoal LDA, Villa Nova de Gaia (PT)

(72) Inventor: Kari Severinkangas, Dornbirn (AT)

(73) Assignee: Tridonic Portugal, Unipessoal LDA, Villa Nova de Gaia (PT)

( * ) Notice: Subject to any disclaimer, the term of this patent is extended or adjusted under 35 U.S.C. 154(b) by 0 days.

(21) Appl. No.: 18/559,386

(22) PCT Filed: Jun. 22, 2022

(86) PCT No.: PCT/EP2022/066958
§ 371 (c)(1),
(2) Date: Nov. 7, 2023

(87) PCT Pub. No.: WO2022/268853
PCT Pub. Date: Dec. 29, 2022

(65) Prior Publication Data

US 2024/0244736 A1 Jul. 18, 2024

(30) Foreign Application Priority Data

Jun. 25, 2021 (EP) .................................... 21181734

(51) Int. Cl.
*H05B 47/175* (2020.01)

(52) U.S. Cl.
CPC ................................ *H05B 47/1995* (2024.01)

(58) Field of Classification Search
None
See application file for complete search history.

(56) References Cited

U.S. PATENT DOCUMENTS

| | | | | |
|---|---|---|---|---|
| 9,924,581 | B1 | 3/2018 | Reh et al. | |
| 11,064,597 | B1 * | 7/2021 | Zaveruha | H05B 47/19 |
| 2013/0221203 | A1 * | 8/2013 | Barrilleaux | H05B 47/1995 250/208.2 |
| 2017/0094028 | A1 * | 3/2017 | Pavlienova | G06F 12/08 |
| 2019/0008019 | A1 * | 1/2019 | Le Hénaff | G01S 5/16 |
| 2019/0342969 | A1 * | 11/2019 | Lee | H05B 47/175 |

FOREIGN PATENT DOCUMENTS

| | | | |
|---|---|---|---|
| WO | 2016154320 | A1 | 9/2016 |
| WO | 2018024528 | A1 | 2/2018 |

OTHER PUBLICATIONS

PCT/EP2022/066958, International Search Report and Written Opinion dated Oct. 26, 2022, 15 pages.

* cited by examiner

*Primary Examiner* — Wilson Lee
(74) *Attorney, Agent, or Firm* — Andrus Intellectual Property Law, LLP

(57) ABSTRACT

Disclosed are a method (1) and a system (2) of configuring an illumination system (3) of a building. The method (1) comprises: determining (10) a configuration of the illumination system (3) in dependence of a building layout and a device control configuration; and remotely commissioning (13) one or more installed illumination devices (31) of the illumination system (3) in accordance with the determined configuration. This enables a more simplified, intuitive and less error-prone configuration of building-based illumination systems.

8 Claims, 6 Drawing Sheets

ISOMETRIC PLAN

METHOD AND SYSTEM OF CONFIGURING AN ILLUMINATION SYSTEM OF A BUILDING

CROSS REFERENCE TO RELATED APPLICATIONS

The present application is the U.S. national stage application of international application PCT/EP2022/066958 filed Jun. 22, 2022, which international application was published on Dec. 29, 2022 as International Publication WO 2022/268853 A1. The international application claims priority to European Patent Application No. 21181734.1 filed Jun. 25, 2021.

BACKGROUND AND SUMMARY OF THE INVENTION

The present disclosure relates to building-based illumination systems and, in particular, to a method and a system of configuring such illumination systems.

Currently building-based illumination systems require a lot of manual configuration before they can be taken into use.

For example, the configuration which switches are linked to which drivers, how effects are run, what happens on sensor events etc. is usually made after an actual installation of the devices of the illumination system. This configuration is typically elaborate and thus susceptible to error in view of the manual configuration approach.

The object of the present disclosure is to enable a more simplified, intuitive and less error-prone configuration of building-based illumination systems.

The invention is defined by the appended independent claims. Preferred embodiments are set forth in the dependent claims and in the following description and drawings.

A first aspect of the present disclosure relates to a method of configuring an illumination system of a building. The method comprises: determining a configuration of the illumination system in dependence of a building layout and a device control configuration; and remotely commissioning one or more installed illumination devices of the illumination system in accordance with the determined configuration.

The building layout may comprise a spatial model of the building including potential physical locations of the illumination devices.

The determined configuration may comprise a response of the illumination system to a stimulus thereof.

The stimulus may comprise one or more of: a reading of a sensor; an actuation of a remote control; and an actuation of a switch.

The device control configuration may comprise a respective response of one or more types of the illumination devices to a stimulus thereof.

The determining may comprise suggesting one or more of: a device type, a physical location, and a group/scene formation of the one or more illumination devices in accordance with the building layout, the user input, and the device control configuration.

The determining may comprise deploying a wizard-based graphical user interface.

The determined configuration may comprise one or more of: a building layout configuration; a device network configuration; a device configuration; a device control configuration; a group/scene configuration defining a respective response of one or more groups comprising one or more of the illumination devices to a stimulus thereof; and/or one or more scenes comprising one or more of the groups to a stimulus thereof.

The determined configuration may be specified in a human-readable high-level description language.

The method may further comprise: simulating the illumination system in accordance with the determined configuration.

The method may further comprise: visualizing the simulated illumination system in accordance with the determined configuration.

The method may further comprise: testing the installed illumination system in accordance with the determined configuration.

A first aspect of the present disclosure relates to a system of configuring an illumination system of a building. The system comprises: a processing device configured to determine a configuration of the illumination system in dependence of a building layout and a device control configuration; and a network edge device configured to remotely commission one or more installed illumination devices of the illumination system in accordance with the determined configuration.

The system may be configured to perform the method of the first aspect or any of its implementations.

The present disclosure enables a more simplified, intuitive and less error-prone configuration of building-based illumination systems by:

- deploying 3D/2D modelling and visualization already used by house architects, real estates/decoration agents etc., for more simplified and intuitive use
- simulating and visualizing a behavior of the illumination system before the actual installation, for faster identification of possible configuration issues,
- creating a configuration and a control model of the illumination system before the actual installation and remotely configuring the installed illumination system, for less manual configuration on site, and
- testing/verifying a correct behavior of the installed illumination system, for faster identification of possible installation issues.

Economic advantages comprise:

- savings in the installation, configuration and maintenance costs, and
- more energy- and cost-optimized solutions.

BRIEF DESCRIPTION OF THE DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
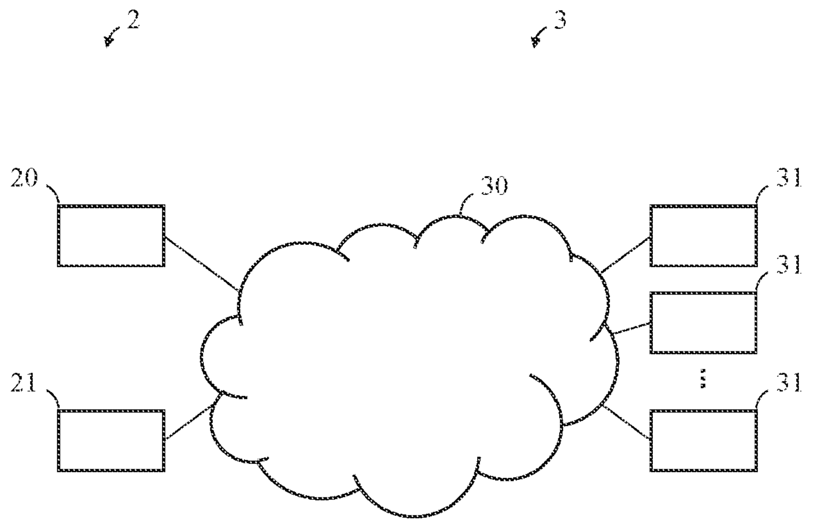

The drawings are to be regarded as being schematic representations, and elements illustrated in the drawings are not necessarily shown to scale. Rather, the various elements are represented such that their function and general purpose become apparent to those skilled in the art.

Figure 2:
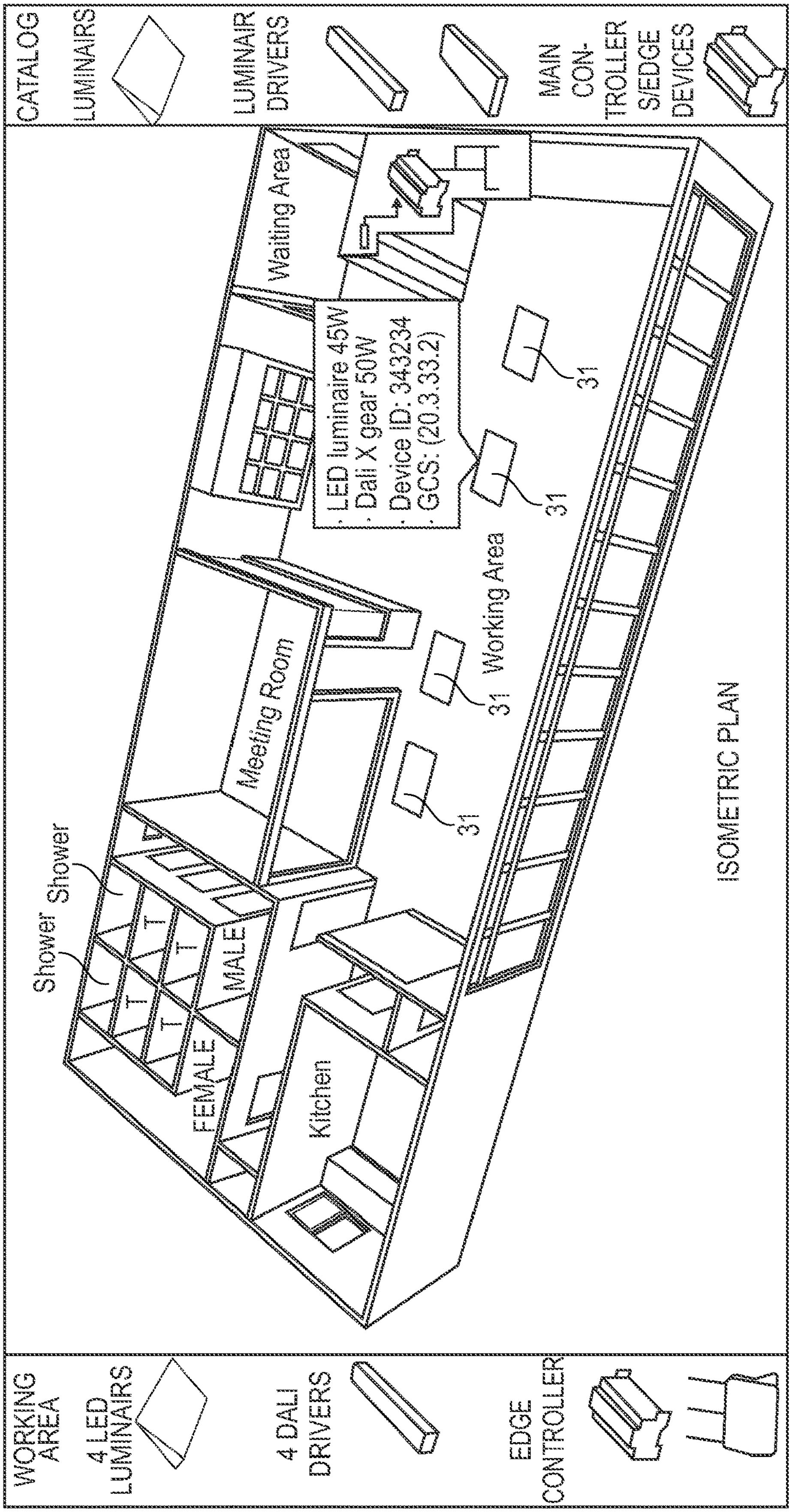
Figure 3:
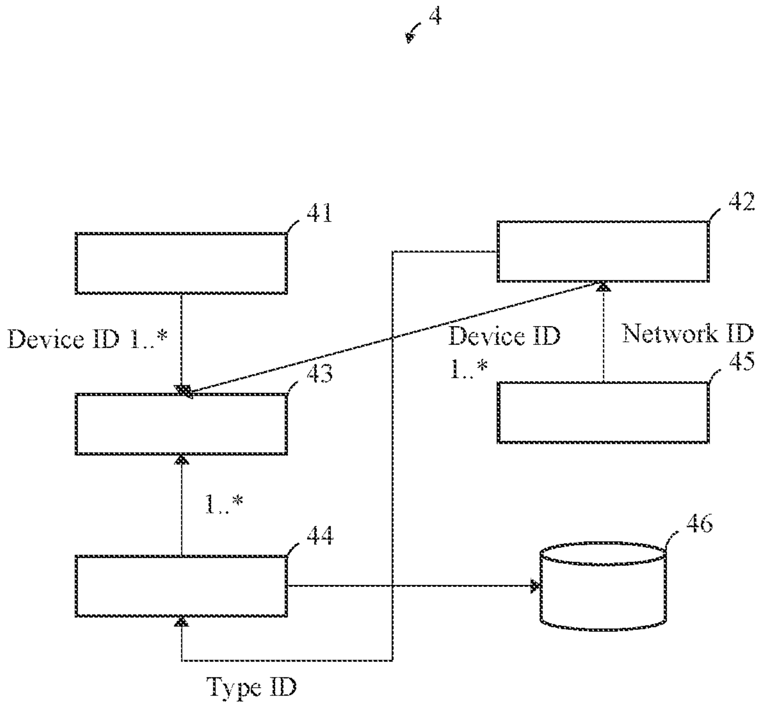
Figure 4:
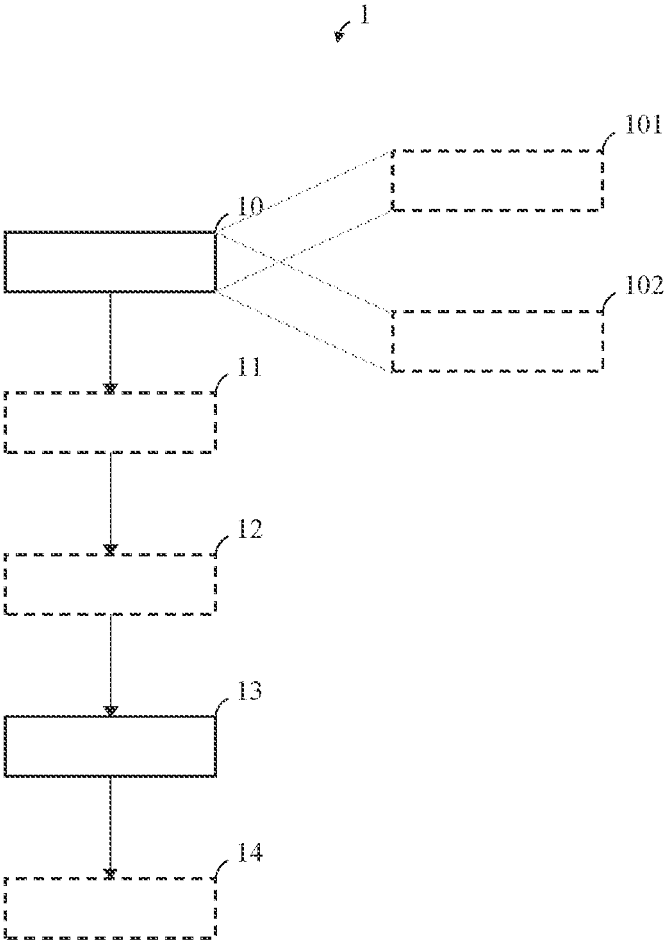
Figure 5:
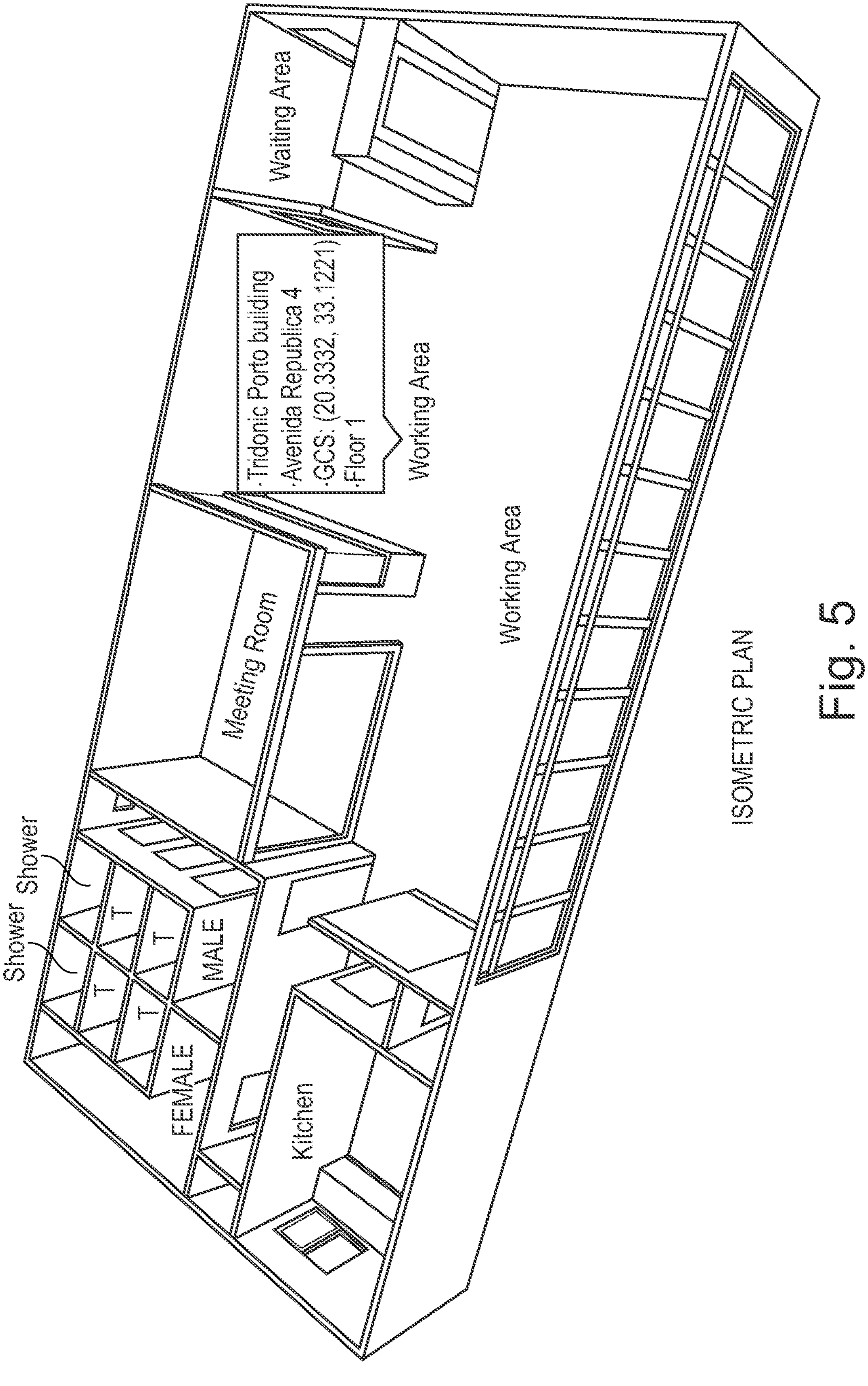
Figure 6:
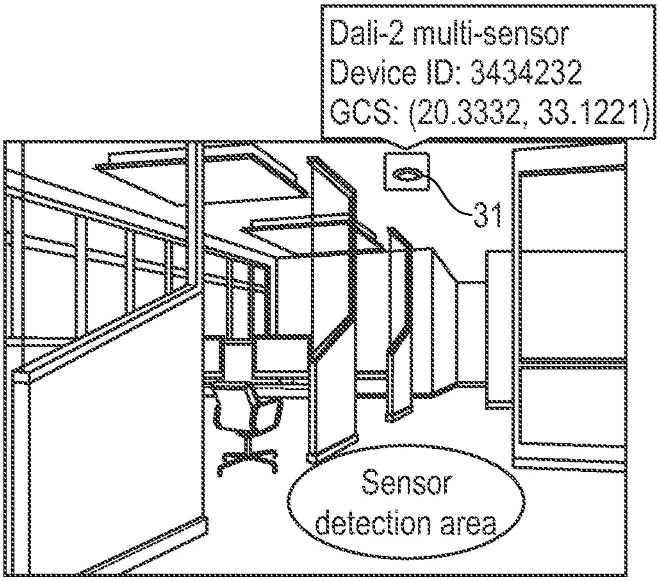
Figure 7:
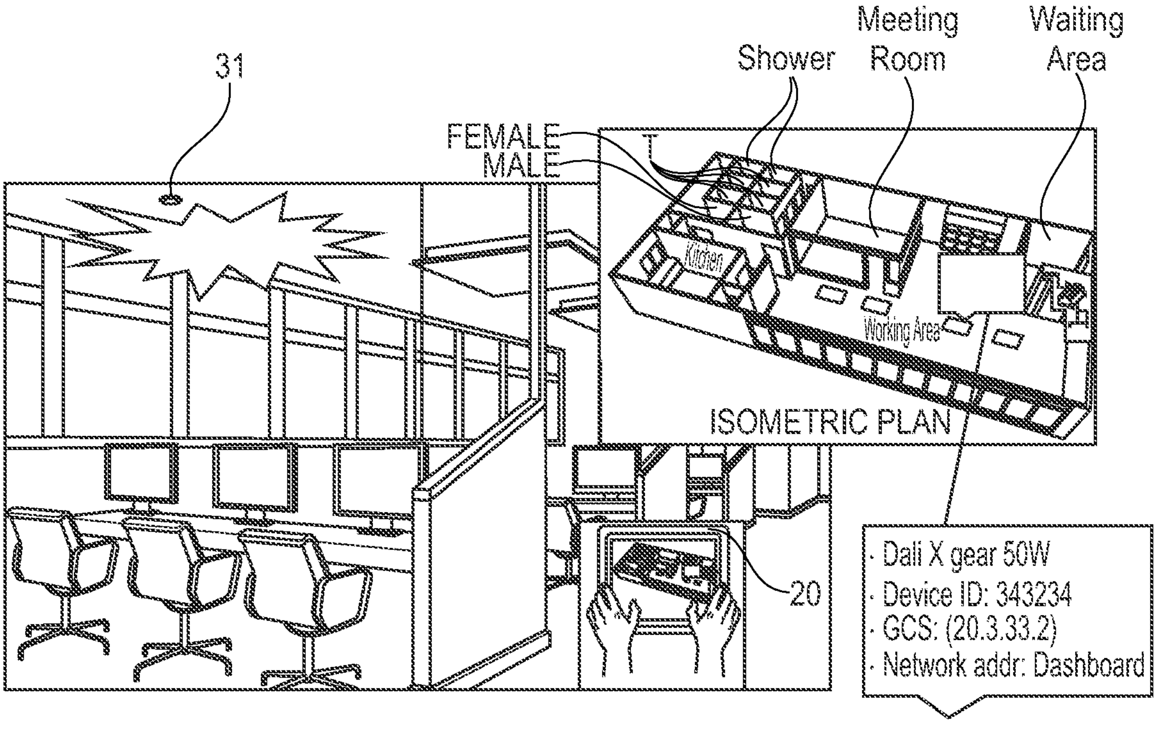

FIG. 1 illustrates a system 2 of configuring an illumination system 3 of a building in accordance with the present disclosure;

FIG. 2 illustrates a GUI of an exemplary configuration tool run by a computing device 20 to determine a configuration of the illumination system 3;

FIG. 3 illustrates a data model 4 of the determined configuration of the illumination system 3;

FIG. 4 illustrates a method 1 of configuring an illumination system 3 of a building in accordance with the present disclosure;

FIG. 5 illustrates an exemplary building layout;

FIG. 6 illustrates a GUI of the exemplary configuration tool run by a computing device 20 to simulate and visualize the illumination system (3) in accordance with the determined configuration; and FIG. 7 illustrates a GUI of the exemplary configuration tool run by a computing device 20 to test/verify the installed illumination system (3) in accordance with the determined configuration.

DETAILED DESCRIPTION OF EXEMPLARY EMBODIMENTS

FIG. 1 illustrates a system 2 of configuring an illumination system 3 of a building in accordance with the present disclosure.

The configuration system 2 comprises a computing device 20 and a network edge device 21.

The computing device 20, such as a desktop PC or a tablet PC, is configured to determine a configuration of the illumination system 3 in dependence of a building layout and a device control configuration.

This may involve executing a graphical configuration tool by the computing device 20.

A configuration as used herein may refer to the way in which an illumination system is composed and set to operate.

FIG. 2 illustrates a GUI of an exemplary configuration tool run by the computing device 20 to determine the configuration of the illumination system 3.

The network edge device 21 is configured to remotely commission one or more installed illumination devices 31, such as drivers, lighting modules, luminaires, sensors etc. of the illumination system 3 in accordance with the determined configuration of the illumination system 3, via an illumination control network 30, such as a radio network or a DALI bus.

Generally, the system 2 may comprise a plurality of network edge devices 21 in the same illumination control network 30.

FIG. 3 illustrates a data model 4 of the determined configuration of the illumination system 3.

In accordance with this data model 4, the determined configuration may comprise one or more of:

- a building layout configuration 41;
- a device network configuration 42;
- a device configuration 43;
- a device control configuration 44; and
- a group/scene configuration 45 defining a respective response of
  - one or more groups comprising one or more of the illumination devices 31 to a stimulus thereof; and/or
  - one or more scenes comprising one or more of the groups to a stimulus thereof.

As shown in FIG. 3, the building layout configuration 41 and the device network configuration 42 may respectively relate to the device configuration 43 of the one or more illumination devices 31, to define an arrangement of the one or more illumination devices 31 in the building and in the illumination control network 30, respectively. The device configuration 43 is the physical or virtual devices' configuration, i.e., the combination of the related configurations, which are set/configured during commissioning, including a dynamic configuration added during commissioning, if any. As such, device configuration 43 is is the final result of the other configurations. All the relevant information is stored in the device's (e.g., network edge device 21, illumination device 31 such as a luminaire, sensor) memory or alternatively in the memory of the computing device 20 which is configured to execute the configuration tool. For example, the device configuration 43 may comprise a device id, type id, software version, device address, location info, network configuration, group and scene configurations.

For each of the one or more illumination devices 31, the device configuration 43 relates to exactly one device type listed (by type ID) in the device control configuration 44. The device control configuration 44 describes each device type and defines each device's 31 logical interface and its attributes, and should refer to the detailed product configuration in the product database 46. The device types (type IDs) may be obtained from the device network configuration 42. The respective device itself does not need to include this configuration, because it is a combination of hardware and the current software. The configuration may be maintained in a network edge device 21 or in a cloud storage/server.

The device network configuration 42 is identified by a unique network ID. All edge devices 21 under this ID can route messages to the network 30. The device network configuration 42 relates to the group/scene configuration 45 which is specific to the illumination system 3.

The determined configuration may be specified in a human-readable high-level description language, such as XML or JSON. The configuration may be translated to low-level machine language in order to speed up the processing time. For example, after installation the run-time operations may require optimizations.

As such, the network edge device 21 may be configured to perform an adaption from the high-level description language to low-level language/protocol. The building layout configuration 41 may comprise, as shown in the following XML example:

- an identification of the building;
- a physical location of the building associated with a coordinate system;
- a street address of the building;
- a logical breakdown of the building into floors and rooms; and/or
- identification information, type information and physical location information of the one or more illumination devices 31.

```
<building id="11223344" latitude=20.32343 longitude=33.33224 coordinate-system=global>
  <street-address>Oxford street 10</street-address>
  <floor id+"1" name="XX">
    <room id="1" name="Delta" latitude=20.32343 longitude=33.33224 type=kitchen, size="20m2">
      <devices>
        <device id=3423432 latitude=20.32343 longitude+33.33524 type="Mesh-gateway-x"/>
```

-continued

```
        <device id=32425432 latitude=20.32643 longitude=33.33724 type="type-Dali-gear-x"/>
        <device id=32323545 latitude=20.32743 longitude=33.33224 type="type-Dali-gear-x"/>
      </devices>
    </room>
    <room id="2" name="Server room" latitude=20.12343 longitude=33.13224 type=storage, size=3m2>
      <devices>
        <device id=12423432 latitude=20.22343 longitude=33.23224 type=Device-edge/>
      </devices>
    </room>
  </floor>
</building>
```

The device network configuration 42 describes the network of the installation, its properties and topology by listing devices in a structured way. The device network configuration 42 may comprise, as shown in the following XML example:

- an identification of the illumination control network 30;
- a logical breakdown (i.e., network topology) of the illumination control network 30; and/or
- identification information, type information, address information and further information of the one or more illumination devices 31.

```
<network id=45543543665>
  <device id=12423432>
    <type id=5464 name="Device-edge"</type>
    <network-config>...</network-config>
    <mesh-config>...</mesh-config>
    <mac>not available</mac>
    <ip-address>not available</ip-address>
    <devices>
      |<device id=32423432>
        <type id=2222 name="Mesh-gateway-x"</type>
        <mac>not available</mac>
        <address>not available</address>
        <mesh-config>...</mesh-config>
        <use-cert>yes</use-cert>
        <devices>
          <device id=32443432>
            <type id=2222 name="Dali-gear-x"</type>
            <mac>not available</mac>
            (address>not available</address>
            <mesh-config/>
            <use-cert>no</use-cert>
          </device>
          <device id=3232235>
            <type id=2222 name="Dali-gear-x"</type>
            <mac>not available</mac>
            <address>not available</address>
```

-continued

```
            <mesh-config/>
            <use-cert>no</use-cert>
          </device>
        </devices>
      </device>
    </devices>
  </device>
</network>
```

In this example, the network edge device 21 which may have IP connectivity is on top and can be controlled from a cloud server. With known hierarchy it is possible for the cloud server to reach each illumination device 31 behind the network edge device 21.

The topology may be different and network may have multiple edges. The physical device may include integrated sensors and drivers, which are listed under it.

The type information may comprise luminaire, LED driver, sensor, gateway (Bluetooth low energy gateway, network edge gateway, etc.).

The address information will be known after commissioning.

Device Control Configuration

The device control configuration 44 defines the devices' 31 interfaces and attributes. In other words, how the devices 31 can be controlled and which capabilities they have.

The device control configuration 44 may comprise for each type of illumination device 31, as shown in the following XML example:

```
<device-control-configuration>
  <device type_id=2222 name="Dali-gear-X" article="280021991" sw-version="1.1">
    <color>
      <max>7200</max>
      <min>3508</min>
    </color>
    <level>
      <max>255</max>
      <min>0</min>
    </level>
    <on>
      <level>255</level>
    </on>
    <off>
      <level>0</level>
    </off>
    <fade-time>
      <max>90</max>
      <min>0.7</min>
    </fade-time>
```

-continued

```
    <fade-rate>
      <max>300</max>
      <min>2</min>
    </fade-rate>
    <scene id=1>
      <scene_desc>presentation mode</scene_id>
    </scene>
  </device>
<device-control-configuration>
```

The example defines the parameters and limits for each device type (type_id). It also defines the logical functions of the specific device. The device control configuration lists all device types used in the network. The article attribute refers to the item in the product database.

A protocol such as the Hypertext Transfer Protocol (HTTP) may be used to indicate a desired action to be performed on the identified resource. The configurations only specify the high-level behavior and the limits of the device.

For example, the HTTP POST request method may be used to call the specific illumination device 31, via the network edge device 21, by providing in the message body:

```
to tune color: < device id=1224433><color>4000</color><fade-rate>20</fade-rate><fade-
time>2</fade-time></device>, or
to switch light on: <device id=1224433>on</device>.
```

In the HTTP example, the HTTP GET request method may be used to read a state of the specific illumination device 31, a single value or all values.

The device control configuration 44 may comprise a respective response of the one or more types of the illumination devices 31 to a stimulus thereof, and may list all device types used in the network.

The device type may be identified by type ID. It may be a combination of a specific HW and SW version. The specific HW type is assumed to be retrievable from a given product database 46. The SW version may also be controlled in the SW configuration system or database.

For example, the device type in the product database 46 may specify, for a particular type of luminaire, that Y milliamperes of current feed result in X % of brightness. Generally, the product database 46 may define the HW characteristics of the device. The device configuration itself may indicate if linear or logarithmic response in the driver should be used.

Sensor Configuration

A sensor control configuration may define a respective response of one or more groups or scenes to a stimulus thereof.

```
<sensors>
  <sensor id=122234 name="kitchen motion sensor">
    <sensitivity>5</sensitivity>
    <trigger>
      <group id=2>
        <fade_speed>3</fade_speed>
        <fade_time>5</fade_time>
        <level>60</level>
      </group>
    </trigger>
</sensors>|
```

Group Configuration

A group may relate to one or more illumination devices 31, and may include other groups as well.

Groups may be called from sensors, switches or from the network edge device 21 with input parameters.

A group control configuration may define a respective response of one or more groups of illumination devices 31 to a stimulus thereof.

For example, activating a group of the following exemplary XML-based group control configuration requires sending a HTTP POST request to the network edge device 21, the message body comprising: <group id=1>on</group>

```
<groups>
  <group_id=2 name"kitchen lights">
    <devices>
      <device_id>3355655</device_id>
      <device_id>3324655</device_id>
      <device_id>3324765</device_id>
    </devices>
  </group>
  |<group_id=3 name"toilet lights">
    <devices>
      <device_id>1155655</device_id>
      <device_id>2224655</device_id>
    </devices>
  </group>
</groups>
```

Scene Configuration

A scene may relate to one or more groups of illumination devices 31. It also may relate to individual devices.

Scenes may be triggered by sensors, switches or external messages.

There may be generic scenes that are configured for all devices (id=1; see the following example). Or there can be specific scenes (id=33334) that define which groups and devices they will trigger. Also time scheduling parameters may be applied.

A scene control configuration may define a respective response of one or more scenes to a stimulus thereof.

For example, activating a scene of the following exemplary XML-based scene configuration requires sending a HTTP POST request to the network edge device 21, the message body comprising: <scene id=33334>on</scene>

```
<scenes>
  <scene id=1 name="presentation">
      <level>20</level>
```

-continued

```
            <fade_speed>3</fade_speed>
            <fade_time>5</fade_time>
        </scene>
        <scene id=33334 name="kitchen no people">
          <group id=2>
            <fade_speed>3</fade_speed>
            <fade_time>5</fade_time>
            <level>50</level>
            <delay>10</delay>
            <level>20</level>
          </group>
          <group id=3>
            <schedule>
              <delay>10</delay>
            </schedule>
            <fade_speed>3</fade_speed>
            <fade_time>5</fade_time>
            <level>30</level>
          </group>
        </scene>
      </scenes>
```

The group/scene configuration 45 may comprise a number of group control configurations and/or scene control configurations. It may also comprise of individual devices.

The group/scene configuration 45 defines the logical bindings between luminaires, sensors, groups and scenes.

FIG. 4 illustrates the method 1 of configuring an illumination system 3 of a building in accordance with the present disclosure.

The system 2 of FIG. 1 may be configured to perform the method 1.

In its simplest form, the method 1 comprises determining 10 and remote commissioning 13 steps, which are indicated using solid lines.

More specifically, the method 1 comprises determining 10 a configuration of the illumination system 3 in dependence of a building layout and a device control configuration; and remotely commissioning 13 one or more installed illumination devices 31 of the illumination system 3 in accordance with the determined configuration.

In addition, the method 1 may comprise further steps which are suggested using dashed lines.

These optional steps may include simulating 11 the illumination system 3 in accordance with the determined configuration.

visualizing 12 the simulated illumination system 3 in accordance with the determined configuration.

testing 14 the installed illumination system 3 in accordance with the determined configuration.

Of note, the simulating 11 and visualizing 12 steps may be executed concurrently, unlike shown in FIG. 3, in order to visualize a simulated illumination scene, for example.

The aforementioned steps are explained in more detail in the following.

Determining Step

The method 1 comprises determining 10 the configuration of the illumination system 3 in dependence of the building layout and the device configuration model.

FIG. 5 illustrates an exemplary building layout.

The building layout may comprise a spatial model of the building including potential physical locations of the illumination devices 31.

The spatial model may include a two-dimensional (2D) floor/ground plan or a three-dimensional (3D) model of the building.

The potential physical locations relate to places within the spatial model of the building where the illumination devices 31, such as lamps, switches, drivers, sensors etc. may be placed. The potential physical locations of the illumination devices 31 are assumed to be predetermined.

The determining 10 step may comprise deploying 102 a graphical configuration tool using a wizard-based graphical user interface (GUI), as depicted in FIG. 2.

The graphical configuration tool run by the computing device 20 may import and render the building layout and other objects in 3D or 2D, may create the 3D model from a picture or from some digital 2D/3D format, and may be used to augment further building information, e.g. name, address, identification of rooms, coordinates, and a scale, so that the configuration tool may calculate coordinates of objects automatically. The coordinates may be associated with a geographic coordinate system, such as GPS, or may with a relative coordinate system where devices are linked. Each building, room, floor has its unique ID so that they can be referenced from other configurations.

Using the graphical configuration tool, the user may place illumination devices 31 at any of the potential physical locations at his or her own discretion.

Alternatively, the graphical configuration tool may just ask what needs to be illuminated and how. For example, the tool may ask what is the purpose of the room (e.g., kitchen, office, meeting room). Then, the determining 10 step may comprise suggesting 101 one or more of a device type, a physical location, and a group/scene formation of the one or more illumination devices 31 in accordance with the building layout and the device control configuration. That is to say, the tool may propose appropriate types of illumination devices, such as drivers and luminaires, at suitable physical locations based on the building information, e.g. room/floor count, room type/size, window and door placements. For example, the tool may suggest the most obvious configurations, and final decisions are made by the user.

An exemplary suggestion may involve:

User input:
- Room size 30 $m^2$
- Meeting room
- One window directed to south
- TV on one wall
- Fully automatic luminaire control Suggestion:
- 4 luminaires
- 1 DALI gear
- 2 groups of luminaires
- 2 sensors, one near the window
- No mechanical switch
- Linked to gateway X.

The user may give further options, such as light color, sensors, automatic control or/and switches. The user input may further comprise detailed input such as desired maximum lux level, light color range, price range, and so on.

The determined configuration may comprise a response of the illumination system 3 to a stimulus thereof, which may comprise one or more of:

a reading of a sensor;

an actuation of a remote control; and an actuation of a switch or dimmer.

The tool may further start a wizard for forming groups comprising one or more illumination devices 31, and/or scenes comprising one or more groups. For example, the tool may suggest groups based on the building layout. The user may add scenes for different places.

More specifically, starting from potential stimulus and the above-mentioned device control configuration, which comprises a respective response of one or more types of the illumination devices to a stimulus thereof, the user may specify individual illumination devices 31, groups formed of illumination devices 31 and scenes formed of groups to define complex illumination effects or scenes triggered in response to stimulus.

The determined configuration may be used for commissioning of the illumination system 3 via the computing device 20, or for simulation of the illumination system 3.

Simulating and Visualizing Steps

The method 1 may further comprise:

simulating 11 the illumination system 3 in accordance with the determined configuration, and visualizing 12 the simulated illumination system 3 in accordance with the determined configuration.

FIG. 6 illustrates a GUI of the exemplary configuration tool run by a computing device 20 to simulate and visualize the illumination system 3 in accordance with the determined configuration.

The figure shows a ceiling luminaire 31 and an associated sensor detection area on the floor.

The spatial simulation may be performed to immediately see how the illumination system 3 behaves and how illumination effects would work while moving within the 3D model of the building.

For example, the determined configuration may comprise a logic that the illumination system 3, and in particular the network edge device 21, may drive the driver of the luminaire 31 with value Y if the sensor reading has value X. Such configurations may be simulated and visualized before installing the illumination system 3.

In this connection, the spatial simulation may also take into account available sensor data/models derived by machine learning. The specific machine learning data/model may be associated with a specific sensor on the digital/virtual floor plan and then stored to a configuration file or database. The machine learning data may depend on a sensor type and/or on a location of the sensor on the floor plan. For example, a training of radar sensors, which may detect user movements and may basically convert radar imaging into a switching signal (ON/OFF) the illumination system 3, usually requires many walks through its sensing zone to attain a desired behavior/model. A sensor behavior/model resulting from machine learning based on such a training may be used in the spatial simulation, and may further be used as well as in an operating phase by storing the machine learning model to the respective sensor 31. The sensor 31 may in turn send new learning data to a database while it learns more, which can then be used in other installations.

Alternatively, the simulation may be linked to real installation devices 31.

The graphical configuration tool simulates the lighting effects, shows the installed devices and their information when selected.

The configuration tool may let the user modify the determined configuration during runtime.

More specifically, the user may modify the determined configuration, view a list of chosen devices (see left side of FIG. 2), and select different products from a catalog (see right side of FIG. 2). The tool may warn the user if some bad configuration is chosen.

Installation

Physical device installation may be carried out in accordance with determined configurations.

Installation personnel may use a commissioning/installation application for viewing where to install the one or more illumination devices 31.

Commissioning Step

The method 1 further comprises remotely commissioning 13 the one or more installed illumination devices 31 of the illumination system 3 in accordance with the determined configuration.

In other terms, the network edge device 21 may be configured to run driver devices of the installed illumination devices 31 in accordance with the determined configuration. In addition, the network edge device 21 may take runtime configuration parameters into account.

During commissioning, the one or more illumination devices 31 are provided with dedicated address information.

Testing/Validation Step

The method 1 may further comprise: testing 14 the installed illumination system 3 in accordance with the determined configuration.

In other words, the user may run a verification process guided by the commissioning/installation application, to verify that the whole illumination system 3 is correctly installed and operable.

FIG. 7 illustrates a user interface of the exemplary configuration tool run by a computing device 20 to test/verify the installed illumination system 3 in accordance with the determined configuration.

For example, the commissioning/installation application may let an installed illumination device 31 flashing and show said illumination device 31 on its GUI.

Thus, the testing 14 may involve a human user.

Alternatively or additionally, the testing 14 may comprise an automatic verification of the illumination system 3 as defined by the determined configuration. For example, the testing 14 may include a verification procedure that the one or more installed illumination devices 31 have been arranged spatially according to plan (i.e., as defined by the determined configuration), by way of automated localization of the one or more installed illumination devices 31.

According to a first example, such an automatic verification procedure may involve a correlation of a simulated behavior and an actual behavior of the illumination system 3.

To this end, the simulating 11 of the illumination system 3 in accordance with the determined configuration may include providing a test sequence for the illumination system 3, i.e., a stimulus of the one or more installed illumination devices 31, such as drivers, lighting modules, luminaires, sensors etc., in accordance with the determined configuration, and based on light, sound and/or radio. E.g., the stimulus may include a random stimulus in a very plain implementation.

generating simulated sensor readings in accordance with the provided test sequence, based on propagation models for the stimulus based on light, sound and/or radio in various levels of complexity, and on simulation techniques for light propagation (e.g., ray-tracing), sound wave propagation, and/or radio wave propagation, and the testing 14 of the installed illumination system 3 in accordance with the determined configuration may include collecting actual sensor readings in accordance with the provided test sequence after commissioning, based on a playout of the provided test sequence (stimulus) and a recording of the stimulated sensor readings.

correlating/matching the simulated sensor readings and the actual sensor readings of the illumination system 3, based on a correlation technique such as a cross-correlation of a time series of the simulated sensor readings and a time series of the actual sensor readings, and resulting in a degree of similarity of the correlated sensor readings as defined by a cross-correlation coefficient. Depending on a predefined threshold for the resulting degree of similarity, it may be concluded that the spatial arrangement of the one or more installed illumination devices 31 is according to plan.

According to a second example, a (semi-)automatic verification procedure may involve a correlation of a simulated appearance and an actual appearance of the illumination system 3.

More specifically, the testing 14 of the installed illumination system 3 in accordance with the determined configuration may include simulating the illumination system 3 in accordance with the determined configuration, as in the simulating 11 step, visualizing the simulated illumination system 3 (simulated appearance) in accordance with the determined configuration, as in the visualizing 12 step, capturing the actual appearance of the illumination system 3 by means of a digital camera of the computing device 20, and correlating/matching the visualized simulated appearance and the actual appearance of the illumination system 3, based on a correlation technique such as image matching or differential-image analysis and resulting in a degree of similarity of the correlated appearances. This may include an automatic adaptation of the visualized simulated appearance in accordance with accurate indoor positioning capabilities of the computing device 20, or a user feedback regarding the degree of similarity between the (static) visualized simulated appearance and the (dynamic) actual appearance while the user varies a perspective of the digital camera. Depending on a predefined threshold for the resulting degree of similarity, it may be concluded that the spatial arrangement of the one or more installed illumination devices 31 is according to plan.

Additionally, the testing 14 may comprise a verification of the illumination system 3 as defined by the determined configuration in terms of an authenticity of the one or more installed illumination devices 31 (i.e., ensuring that the devices are not counterfeit).

For example, this may be achieved by linking the one or more installed illumination devices 31 with respective virtual IDs, such as for example manufacturer certificates (e.g., a specific certificate per driver type/model to keep certificate management simple) in the determined configuration. In particular, the certificate may be a digital certificate. In the installation place the commissioner may verify the certificate and thereby make sure a certified device has been commissioned. This would guarantee that who plans the luminaire floor plans can be sure that the right devices are installed.

The invention claimed is:

1. A method (1) of configuring an illumination system (3) of a building, the method (1) comprising:

providing a computing device (20) deploying a graphical configuration tool having a graphical user interface depicting a building layout comprising a spatial model including potential locations for illumination devices (31);

providing one or more edge devices (21) configured to remotely commission one or more installed illumination devices (31) via an illumination control network (30);

determining (10) a configuration of the illumination system (3) using the graphical configuration tool in dependence of a data model (4) comprising at least a device control configuration which defines interfaces and attributes of the illumination devices (31), wherein the determined configuration comprises a response of the illumination system (3) to a stimulus comprising one or more of: a reading of a sensor, an actuation of a remote control, and an actuation of a switch;

simulating (11) the operation of the illumination system (3) with the graphical configuration tool in accordance with the determined configuration;

visualizing (12) the operation of the simulated illumination system (3) on the graphical user interface of the graphical configuration tool depicting said building layout; and remotely commissioning (13) one or more installed illumination devices (31) of the illumination system (3) with said one or more network edge devices (21) in accordance with the determined configuration.

2. The method (1) of claim 1, the device control configuration comprising a respective response of one or more types of the illumination devices (31) to a stimulus thereof.

3. The method (1) of claim 2, wherein the determining (10) step comprises suggesting (101) one or more of: a device type/configuration, a physical location, and a group/scene formation of the one or more illumination devices (31) in accordance with the building layout, the user input, and the device control configuration.

4. The method (1) of claim 1, wherein the determining (10) step comprises deploying (102) a wizard-based graphical user interface.

5. The method (1) of claim 1, wherein the data model contains the determined configuration for each of the one or more illumination devices further comprises one or more of:

a building layout configuration (41);

a device network configuration (42);

a device control configuration (44);

a group/scene configuration (45) defining a respective response of one or more groups comprising one or more of the illumination devices (31) to a stimulus thereof; and/or one or more scenes comprising one or more of the groups to a stimulus thereof.

6. The method (1) of claim 1, wherein the determined configuration is specified in a human-readable high-level description language.

7. The method (1) of claim 1, further comprising:

testing (14) the installed illumination system (3) in accordance with the determined configuration.

8. The method of claim 1 wherein the illumination control network comprises a wireless radio network or a DALI bus.

* * * * *